Feb. 18, 1969  R. E. KRAL  3,427,781
AUTOMATIC TRAY MECHANISM FOR PACKAGE SEALERS
Filed Dec. 29, 1966

INVENTOR
Robert E. Kral

BY Hovey, Schmidt, Johnson & Hovey
ATTORNEYS.

United States Patent Office 3,427,781
Patented Feb. 18, 1969

3,427,781
AUTOMATIC TRAY MECHANISM FOR PACKAGE SEALERS
Robert E. Kral, 6351 W. 10th St., Topeka, Kans. 66615
Filed Dec. 29, 1966, Ser. No. 605,855
U.S. Cl. 53—74        10 Claims
Int. Cl. B65b 57/12, 9/12, 51/30

ABSTRACT OF THE DISCLOSURE

A folded, heat-sealable packaging film is repeatedly fed to a sealing device in unison with successive articles to be packaged. A pusher between the layers of the film engages individual articles inserted between the layers and advances each article toward the sealer to, in turn, also advance the film by forcing the leading edge of the article against a transverse seal line in the film formed by the previous sealing operation.

---

The primary object of this invention is to provide apparatus for automatically successively feeding articles to a packaging film sealer in order to decrease the time and personnel required to package the articles as compared with hand-feeding techniques. In particular, the invention is directed to the automatic packaging of products which may be weighed and oftentimes placed in trays for wrapping with a film capable of being heat sealed.

As a corollary to the foregoing object, it is an important aim of the invention to provide a feeder for a package sealer that effects advancement of the articles and the film in unison into the sealer by contact with the article only, thereby simplifying the apparatus and precluding damage to the film which could be caused by direct interengagement of the film and the advancing mechanism.

Another important object is to provide such a feeder which supports the film in its travel to the sealer with the film folded longitudinally to present a pair of superimposed layers, and with the film terminating at the sealer in a transverse line of seal bonding the layers together formed by the previous sealing operation, to the end that the aforesaid operating mechanism, by pushing against an article inserted between the layers, advances the article and the film in unison by interengagement of the leading edge of the article and the transverse line of seal.

Another object is to provide an air suction device for drawing waste film thereinto remaining after each operation of the sealer in order to efficiently remove the waste to preclude interference with sealer operation.

Figures 2, 4:
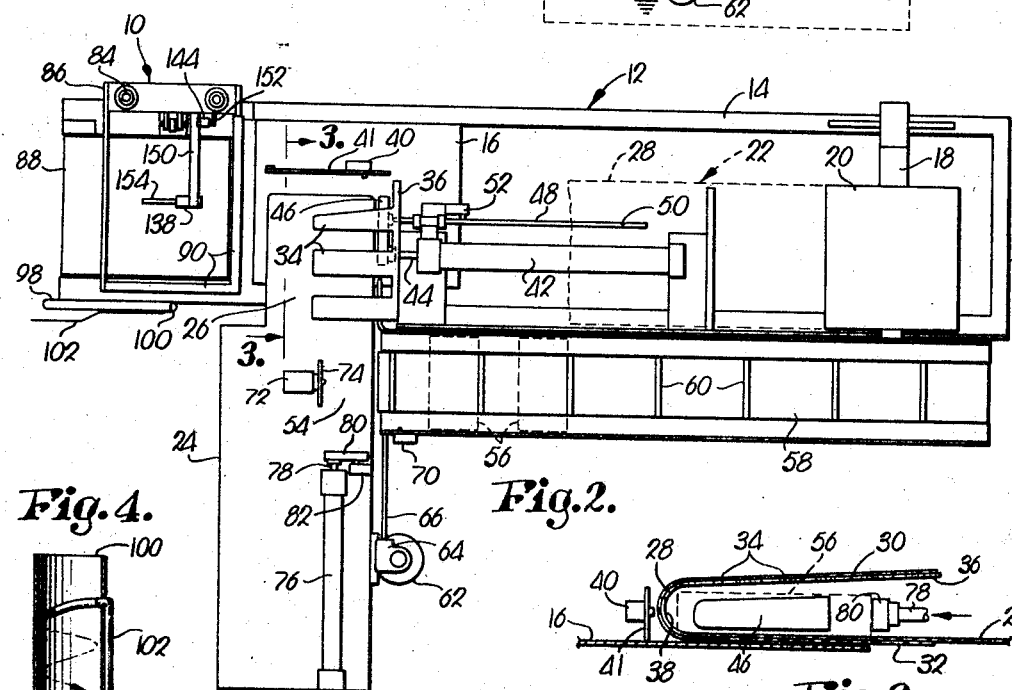
FIG. 2 is a plan view, partially diagrammatic, of the apparatus.
FIG. 4 is a detail of the suction tube showing the upper end thereof in longitudinal section.

Referring initially to FIG. 2, a conventional packaging film sealer 10 is shown at the discharge end of a feeder broadly denoted 12 having an elongated underframe 14 supporting a rectangular guide table 16 adjacent sealer 10 at one end of frame 14. A spindle 18 is mounted on frame 14 adjacent the opposite end thereof and carries a roll 20 of heat-sealable, transparent packaging film. As will be appreciated hereinafter, during operation of the feeder the film is unrolled from roll 20 in the form of an elongated stretch 22 of film which extends longitudinally toward sealer 10. Stretch 22 is illustrated by broken lines in FIG. 2 and is broken away approximately midway between roll 20 and sealer 10.

Figure 3:
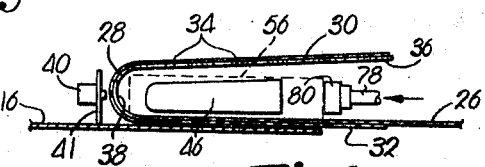
FIG. 3 is a vertical sectional view taken along line 3—3 of FIG. 2.

An elongated, horizontal platform 24 extends laterally of frame 14 and film stretch 22 and presents a guide plate 26 overlying table 16 in spaced relationship thereto. The film emanating from roll 20 is folded at 28 along one longitudinal edge thereof and hence presents two superimposed film layers 30 and 32, as illustrated in FIG. 3. The lower layer 32 is confined between table 16 and guide plate 26, the upper layer 30 being disposed in overlying relationship to three elongated fingers 34 extending longitudinally of stretch 22 from a spreader 36 mounted on table 16. As is evident in FIG. 3, spreader 36 is generally J-shaped in configuration, the leg of the spreader being integral with fingers 34 and supporting the latter in approximately horizontal alignment and in vertically spaced relationship to plate 26. The curved portion 38 of spreader 36 imparts a rounded contour to stretch 22 at a longitudinal zone thereof along fold 28. A limit switch 40 is mounted on table 16 with its actuator arm normally slightly spaced from fold 28 and extending through an opening (not shown) in a stop plate 41 on table 16.

Table 16 and frame 14 support a pneumatic piston and cylinder assembly 42 between layers 30 and 32, assembly 42 having a piston rod 44 supporting a pusher plate 46 normally disposed adjacent the right-hand edge of guide plate 26 as viewed in FIG. 2. Pusher 46 carries a rod 48 parallel to piston rod 44 having a notch 50 therein adjacent the end of rod 48 remote from pusher 46. A switch 52 is supported with its actuator arm riding on rod 48 and normally depressed thereby.

An article-receiving support 54 is presented by a portion of platform 24 spaced laterally of stretch 22, support 54 receiving individual articles such as trays 56 shown by broken lines on an endless conveyor 58. Lugs 60 are spaced along conveyor 58, each tray 56 being disposed on the conveyor with one edge engaged by a corresponding lug 60, the lugs being provided for the purpose of maintaining uniform spacing between adjacent trays and assuring that the trays will be positively shifted onto support 54. The conveyor 58 is driven by an electric motor 62 through reduction gearing 64 and a drive shaft 66 connecting the output of gearing 64 with the drive drum 68 (shown diagrammatically in FIG. 1) of conveyor 58. A conveyor safety switch 70 is disposed adjacent the discharge end of conveyor 58 for a purpose to be discussed hereinafter.

A limit switch 72 is mounted on platform 24 with its actuator arm extending through an opening (not shown) in a stop plate 74. Switch 72 initiates operation of a pneumatic piston and cylinder assembly 76 mounted on the outboard portion of platform 24, assembly 76 having a piston rod 78 supporting a pusher plate 80 which normally holds against and depresses the actuator arm of a switch 82 behind pusher 80.

Figure 6:
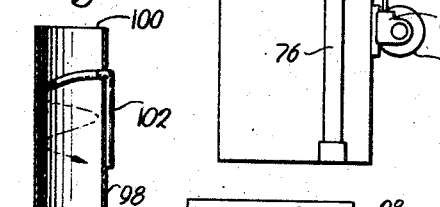
FIG. 6 is a diagrammatic illustration showing the manner in which the article is sealed within the film.

Sealer 10 is provided with a pair of upright guide rods 84 which support a frame 86 for vertical, reciprocal movement toward and away from the upper stretch of an endless belt conveyor 88. Frame 86 carries a pair of sealer bars disposed at right angles to each other, each bar 90 having an electrical heating element therein (not shown) which, upon energization, heats the bars to a temperature to effect sealing of the film to bond the layers 30 and 32 together upon contact of bars 90 with the film. Such contact is effected when frame 86 is in its normal, lowermost position with bars 90 disposed just outside corresponding marginal edges of conveyor 88. The interrelationship between the tray 56 being packaged, conveyor 88, and bars 90 during operation of sealer 10 is illustrated in FIG. 6, the seal lines 92 representing the seal effected by contact of bars 90 with the film. Note the presence of an additional seal line 94, the latter being formed during the previous operation of sealer 10 when such line 94 corresponded to the transverse line 92 in FIG. 6. It should be understood that the seal lines, besides bonding layers 30 and 32 together, separate the package from stretch 22, thereby leaving the end of stretch 22 at sealer 10 closed by a transverse seal.

Figure 5:
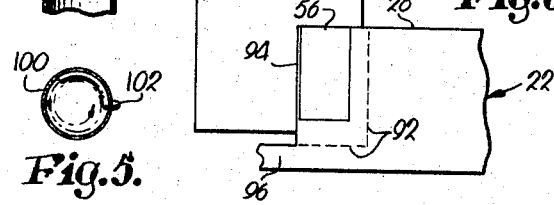
FIG. 5 is a detail of the tube looking axially thereinto from the upper end.

A waste strip 96 along the edge of stretch 22 remote from fold 28 is removed by an inclined suction tube 98 having an upper, open end 100 adjacent the edge of conveyor 88 corresponding to the longitudinal sealer bar 90. Tube 98 is open at both ends, suction being created by an air line 102 which extends through the side of the tube adjacent upper end 100 (FIG. 4) and follows the internal curvature of the tube wall (FIG. 5). The end of line 102 in the tube is also bent downwardly and, when air under pressure is supplied to line 102, such disposition of line 102 establishes a spiral airflow path within the tube as illustrated. This creates a partial vacuum at upper end 100 to draw waste strip 96 thereinto for continuous discharge from the lower end of tube 98.

Figure 1:
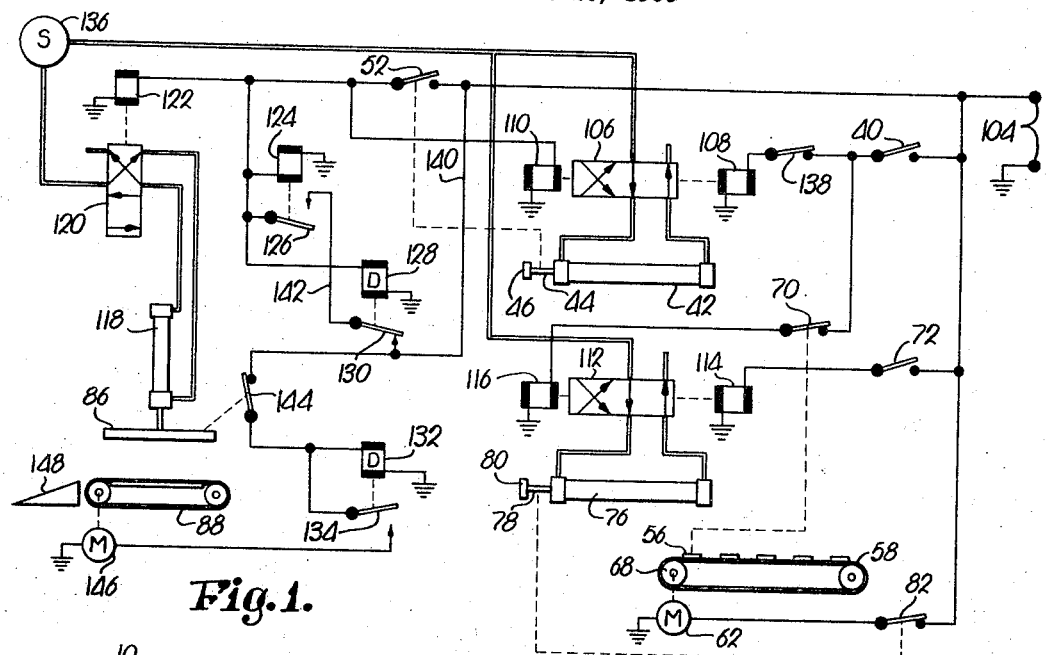
FIGURE 1 is a schematic illustration of the electrical and pneumatic controls for the apparatus.

The pneumatic controls and operating circuitry for the apparatus is illustrated in FIG. 1. A suitable electrical power source is connected across terminal 104. Pneumatic cylinder 42 is controlled by a valve 106 operated by a pair of solenoids 108 and 110. Pneumatic cylinder 76 is controlled by a valve 112 operated by a pair of solenoids 114 and 116. A pneumatic piston and cylinder assembly 118 is illustrated having its piston rod connected to frame 86 of sealer 10 for reciprocating the frame along guide rods 84 (FIG. 2). Pneumatic cylinder 118 is controlled by a valve 120 which is biased toward the position illustrated, valve 120 shifting to a second position upon energization of an operating solenoid 122.

Three relays are utilized in the circuitry. Relay coil 124 operates a normally open relay switch 126. The remaining two relays are delay relays of the slow-to-pull-in type and comprise a coil 128 operating a normally closed switch 130 and a coil 132 operating a normally closed switch 134, the latter being shown in the open position with coil 132 energized.

Other components of the electrical system previously described are designated in FIG. 1 by the same reference characters. Conveyor motor 62 is shown energized with conveyor 58 in operation. Except for delay relay 132, 134 and motor 62, however, the components of FIG. 1 are shown in their normal, standby positions.

With the apparatus in standby and conveyor 58 operating to effect delivery of the first tray 56 to support 54, such as at the commencement of a run, air under pressure from a source 136 communicates with valves 106, 112 and 120 via the lines illustrated to hold the piston rods of the three pneumatic cylinders 42, 76 and 118 retracted. When the tray arrives at support 54 and strikes stop plate 74, switch 72 is closed by engagement of the tray with its actuator arm to close a power circuit to solenoid 114. This shifts valve 112 to its right-hand position to reverse the pneumatic connections to cylinder 76, thereby causing piston rod 78 to extend under pneumatic pressure. This moves pusher 80 into engagement with the tray to slide the latter from support 54 and onto the guide plate portion 26 of platform 24. As illustrated in FIG. 3, as pusher 80 approaches the end of its path of travel with piston rod 78 approaching its maximum reach, the tray 56 is inserted between film layers 30 and 32. At approximately the maximum extension of piston rod 78, tray 56 is forced into contact with the zone of the film along fold 28 to, in turn, depress the actuator arm of switch 40. Closure of switch 40, in turn, energizes solenoid 116 to return valve 112 to the position shown and retract pusher 80. It should be noted that, as pusher 80 moved away from its normal position, the actuator arm of switch 82 was released to open the switch and break the power circuit to conveyor motor 62. Thus, conveyor 58 operates only when pusher 80 has returned to its normal position with piston rod 78 completely retracted.

Closure of switch 40 also establishes a power circuit to solenoid 108 to shift valve 106 to its right-hand position and reverse the pneumatic connections to cylinder 42. This extends piston rod 44 under pneumatic pressure to force pusher 46 against the tray 56 now inserted between layers 30 and 32 and resting on guide plate 26. This advances the tray into sealer 10 onto conveyor 88, the tray being guided by stop plate 41.

At this juncture it should be understood that, prior to commencement of operation of the apparatus, the operator unrolls stretch 22 from roll 20 and threads the stretch through the guide structure by hand to sealer 10, whereupon the sealer is operated by override controls (not shown) to place the transverse seal line 94 therein discussed previously in this specification. Therefore, as the inserted tray 56 is advanced onto conveyor 88 by pusher 46, the leading edge of the tray engages seal line 94 and causes the film to unroll. In this manner, the film and the tray are advanced into sealer 10 in unison to the position illustrated in FIG. 6, whereupon the actuator arm of switch 52 falls into notch 50 and closes switch 52 to energize solenoid 110 and return valve 106 to the normal position illustrated. This retracts piston rod 44 and pusher 46 and returns the same to the normal positions thereof illustrated in FIG. 2.

Momentary closure of switch 52 also establishes a power circuit to solenoid 122 which shifts valve 120 to its off-normal position; additionally, the closing of switch 52 energizes relay coil 124. Operation of this relay is necessary in order to hold operating potential on solenoid 122 via a circuit along a lead 140 to switch 130, along a lead 142 to the now closed switch 126, and thence to solenoid 122 through switch 138. Since valve 120 is biased to return to the normal position shown, it is necessary to maintain solenoid 122 energized to hold valve 120 in the off-normal position. The time interval during which valve 120 is operated is controlled by the pull-in time of relay coil 128, it being appreciated that ultimate pull-in of this delay relay will open switch 130 and break the power circuit to solenoid 122 and relay coil 124. This time interval corresponds to the time required for the piston rod of cylinder 118 to extend to place sealer bars 90 in contact with the film, plus the time required for the seal to be formed.

After relay coil 128 times out, cylinder 118 raises frame 86 and returns the latter to its normal position in vertically spaced relationship to conveyor 88. As illustrated in FIG. 1, frame 86 closes a switch 144 when the frame is in its normal position. Switch 144, when closed, maintains relay coil 132 energized to, in turn, hold switch 134 open (after the initial time-out period of coil 132). When frame 86 is lowered, opening of switch 144 de-energizes coil 132 to effect closure of switch 134. Therefore, reclosure of switch 144 when frame 86 is raised establishes a temporary power circuit to drive motor 146 of conveyor 88 via lead 140 and switches 144 and 134. Thus, conveyor 88 operates until relay coil 132 times out, the delay period being selected to cause the packaged tray on conveyor 88 to be discharged therefrom, such as onto a ramp or chute 148 illustrated diagrammatically in FIG. 1. It will be appreciated that the next cycle of operation to package the next tray 56 commences immediately upon return of pusher 80 to its normal position, thus the feeding cycle may commence prior to actual completion of the sealing operation by sealer 10.

Referring to FIG. 2, stationary arm 150 is shown mounted on sealer 10 and extending into overlying relationship to the central portion of sealer 10, arm 150 supporting a normally closed safety pile-up switch 138 (connected in series with solenoid 108) and the discharge conveyor control switch 144. Note that switch 144 is positioned for actuation by a finger 152 on the movable frame 86. Switch 138 is provided with a downwardly extending actuator member 154 which closely overlies conveyor 88 such that, in the event that conveyor 88 should malfunction and two trays should pile up thereon, the overlapped trays would be forced against member 154 to open switch 138 and prevent operation of the sealer.

The normally closed safety switch 70 for conveyor 58 serves a similar function and is connected in series with solenoid 116. If a pair of adjacent trays 56 on conveyor 58 do not abut their associated lugs 60 but, instead, abut each other, switch 70 will be held open by the presence of a tray 56 partially supported by the end of conveyor 58 and blocked by piston rod 78 during advancement of the preceding tray by pusher 80, thereby preventing return movement of pusher 80 until the situation is corrected.

Having thus described the invention, what is claimed as new and desired to be secured by Letters Patent is:

1. For use with a device for sealing packaging film, a machine for successively feeding articles to be packaged to said device in unison with said film, said machine comprising:
   structure for supporting an elongated stretch of said film for movement along a longitudinally extending path of travel toward said device with said stretch folded longitudinally to present a pair of superimposed layers, and with said stretch terminating at the device in a transverse line of seal bonding said layers together,
   said structure having means for holding said layers spaced apart away from the fold and said line of seal;
   an article pusher mounted on said structure for movement along said path, toward and away from said device;
   apparatus disposed laterally of said path and remote from said fold when the stretch is supported on said structure for receiving said articles and feeding the latter in succession into said path between the device and the pusher to insert each article between said layers; and
   operating mechanism coupled with said pusher and responsive to the insertion of each article for advancing the pusher toward the device to, in turn, force the inserted article against said line of seal to advance the inserted article and the stretch as a unit to said device.

2. The invention of claim 1,
   said mechanism including an electrically initiated drive for said pusher, and an energizing circuit coupled with said drive and provided with a control switch disposed for actuation by each article upon insertion thereof between said layers by said apparatus.

3. The invention of claim 1,
   said apparatus including an article-receiving support spaced laterally of said path, a second article pusher shiftable toward and away from said path across said support, and a second operating mechanism coupled with said second pusher and responsive to delivery of individual articles to said support for shifting the second pusher toward said path to effect said insertion.

4. The invention of claim 3; and
   a conveyor for supporting said articles and successively delivering the latter to said support,
   there being control means coupled with said conveyor and rendering the latter inoperative during shifting of said second pusher by said second mechanism.

5. The invention of claim 4,
   said second mechanism including an electrically initiated drive for said second pusher, and an energizing circuit coupled with said drive and provided with a control switch disposed for actuation by each articles upon delivery thereof to the support by said conveyor.

6. The invention of claim 1,
   said structure including a guide table for supporting said stretch in a transversely horizontal attitude with the lowermost layer overlying the table, and a horizontal guide plate spaced above said table to confine said lowermost layer between the table and the plate,
   said plate extending laterally of said path and being disposed to slidably receive said articles thereon as the latter are fed into said path by said apparatus.

7. The invention of claim 6,
   said holding means including a spreader for separating said layers,
   said spreader being provided with a plurality of elongated, laterally spaced fingers extending in parallelism with said path and spaced above said plate for supporting the uppermost layer.

8. The invention of claim 6,
   said apparatus including a second article pusher having a normal position spaced from said path, means mounting said second pusher for reciprocal movement over said plate, toward and away from said path, and a second operating mechanism coupled with said second pusher and responsive to delivery of individual articles to a location ahead of the pusher for advancing the latter toward said path to slide the article along the plate to an inserted disposition between said layers.

9. The invention of claim 1; and
   a suction tube adjacent said device for drawing waste film thereinto remaining after each operation of the device.

10. The invention of claim 9,
    said tube having an open, waste-receiving end provided with an air line therein disposed to create a spiral air flow in the tube directed toward the opposite end thereof.

References Cited

UNITED STATES PATENTS

| 2,747,346 | 5/1956 | Tigerman et al. | 53—182 X |
| 3,045,403 | 7/1962 | Mitchell | 53—74 |
| 3,302,369 | 2/1967 | Vinciguerra | 53—182 |
| 3,327,451 | 6/1967 | Forman | 53—182 |

TRAVIS S. McGEHEE, Primary Examiner.

U.S. Cl. X.R.

53—77, 182